Nov. 25, 1958 N. KIMMEL 2,861,615
HANDLE FASTENER FOR HANDBAGS AND THE LIKE
Filed April 10, 1957
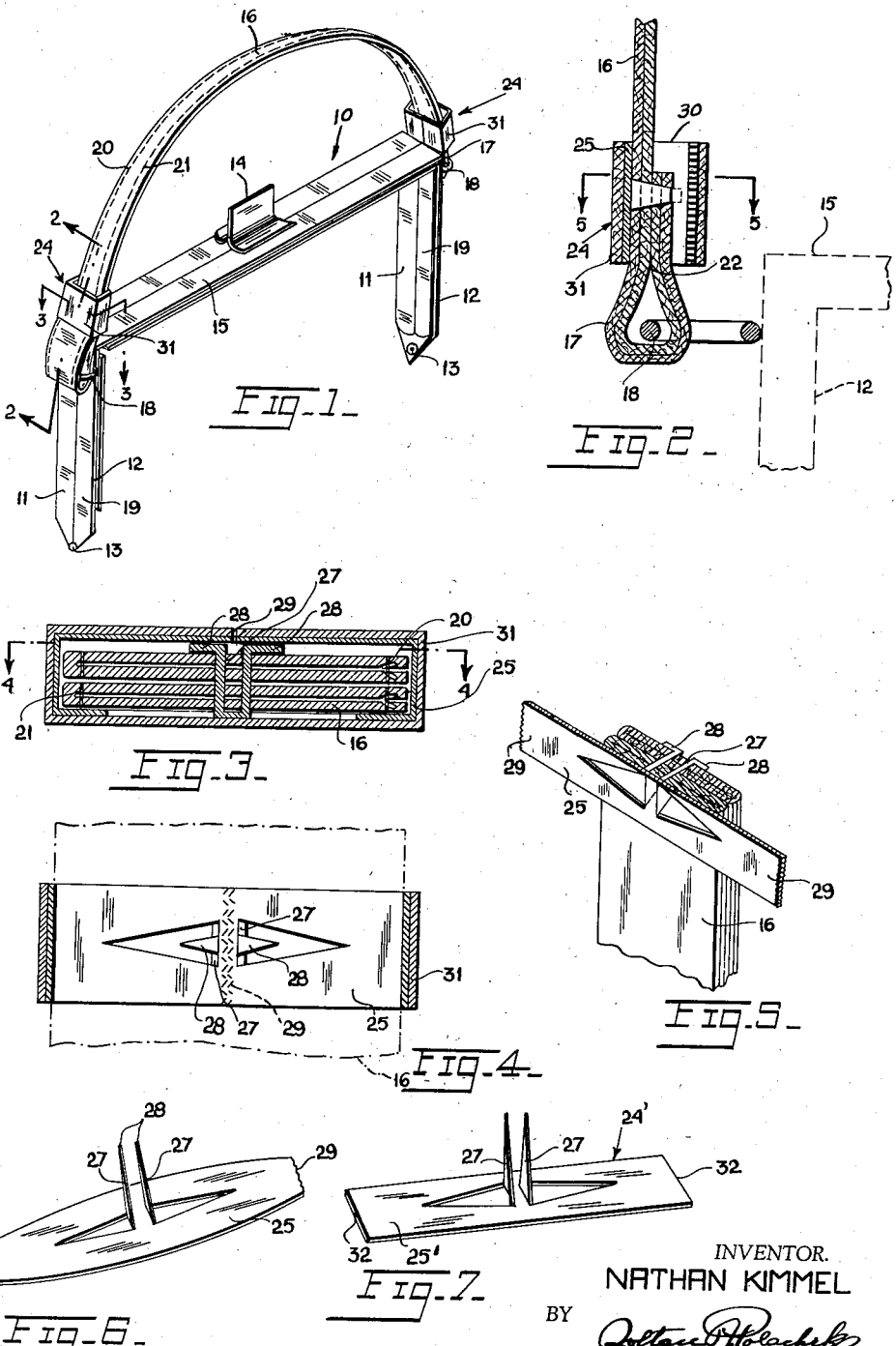
INVENTOR.
NATHAN KIMMEL
BY
ATTORNEY

United States Patent Office 2,861,615
Patented Nov. 25, 1958

2,861,615

HANDLE FASTENER FOR HANDBAGS AND THE LIKE

Nathan Kimmel, Brooklyn, N. Y.

Application April 10, 1957, Serial No. 652,030

8 Claims. (Cl. 150—12)

This invention relates to flexible handles for ladies' handbags, pocketbooks, brief cases and the like and, more particularly, to new and useful improvements in a fastener device for fastening the end of the handle to the handbag and the like.

Heretofore, in attaching a flexible handle to a handbag and the like, the end of the handle would be inserted through the metal ring or loop secured to the metal frame of the handbag, then turned upon itself to form a loop and a rivet or staple would be driven through the looped end and body of the handle. A tubular clip would then be sleeved around and pinched to the handle at the joint in order to conceal the unfinished end of the loop and joint. However, such clips or sleeves after a short period of use become loose and displaced and slid along the handle.

It is, therefore, the primary object of the present invention to provide a structure for fastening the end of a flexible handle to a handbag and the like which is readily applied, which is secure against displacement along the handle, which eliminates the necessity for extraneous rivets and staples, which does not interfere with the swivel action of the handle and which permits the handle to collapse against the handbag when not in use.

An important object of the invention is to provide a structure for fastening the end of a flexible handle to a handbag and the like, for strengthening the joint between the handle and handbag, for concealing the joint and for enhancing the appearance of the handbag and the like.

It is also proposed to provide a structure of this kind which is simple in construction and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a fragment of a handbag showing a handle fastened to the frame of the bag with a fastener device embodying the invention.

Fig. 2 is an enlarged vertical sectional view taken on the plane of the line 2—2 of Fig. 1.

Fig. 3 is an enlarged horizontal sectional view taken on the plane of the line 3—3 of Fig. 1.

Fig. 4 is an enlarged sectional view taken on the plane of the line 4—4 of Fig. 3.

Fig. 5 is a horizontal sectional view taken on the plane of the line 5—5 of Fig. 2.

Fig. 6 is a bottom perspective view of the fastener device.

Fig. 7 is a similar view of a modified form of fastener device.

Referring to the drawings in detail, in Fig. 1 there is shown a sectional metal frame 10 of a lady's handbag comprising two juxtaposed frame sections 11 and 12 U-shaped in configuration and cross section and pivoted together at their ends as indicated at 13, 13. The section 12 carries a latching finger piece 14 at the center of its crosspiece 15 which coacts with a stationary stud (not shown) on the frame section 11 to hold the handbag in closed position.

A flexible handle 16 is hingedly connected to the frame 10 by means of loops 17 formed on the ends of the handle extending through and over metal rings or flattened loops 18 secured to and projecting from the side legs 19, 19 of the frame section 12 adjacent the crosspiece 15. The handle is formed of an elongated leather strap folded longitudinally upon itself forming two plies of material positioned face to face and secured together along their long edges by rows of stitching 20 and 21. The connection between the handle and frame 10 is formed by turning the ends of the handle upon themselves thereby providing the loops 17, with the extremities of the handle disposed in face-to-face position or overlapping relation with the body of the handle as indicated at 22. The extremities of the handle and the body of the handle are fastened together by fastener devices 24 made in accordance with the present invention. Each fastener device 24 comprises a tubular clip or sleeve 25 bent and formed from a bendable rectangular-shaped sheet meal or brass plate, preferably with slightly curved long edges as shown in Fig. 6. Along its longitudinal center, the plate is formed with outstruck prongs 27, 27, extending at right angles to the body of the plate, with pointed ends 28, 28. The end edges of the plate are formed with teeth 29, 29.

In applying the fastener device 24 to fasten the loops 17 to the body of the handle 16, the prongs 27, 27 are forced through the four overlapping plies of leather constituting the joint, and the pointed ends 28, 28 are bent over the faces of the adjacent ply of leather as shown in Fig. 5. The ends of the plate 25 are then bent at right angles around the long edges of the plies of leather into abutting end relation over the bent ends 28, 28 of the prongs, with the teeth 29, 29 on the end edges thereof in meshing relation as shown in Fig. 3. The fastener device 24 is so positioned around the joint that its upper edge 30 as viewed in Fig. 2 is disposed above the extremity of the \free end of the loop 17 so that said end is hidden from view.

It will thus be noted that the fastener device 24 securely fastens the free end of the loop to the body of the handle, protects and conceals the unfinished end of the loop, strengthens the connection between the handle and body of the handbag and decorates and ornaments the handle thereby enhancing the appearance of the handbag.

If desired, a strip of leather 31 which matches the leather from which the handle is made may be adhesively secured around the outer surface of the fastener device 24 for concealing the openings in the device formed by the prongs 27, 27 and for further enhancing the appearance of the handbag.

In Fig. 7, a modified form of fastener device 24' is shown. This form differs from the form shown in Fig. 6 in that the corners of the plate 25' are squared off and the end edges 32, 32 are smooth, without any teeth, such as the teeth 29.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A one-piece metal fastener device for use in fastening the extremity of a looped end of a handle strap to the body of the strap comprising a tubular metal sleeve member having a body substantially square in cross section including a front portion to receive the overlapping extremity of the looped end and the adjacent portion of the body of the strap, means on the front portion for penetrating the said extremity of the looped end and the adjacent portion of the body of the strap, rearwardly extending side portions at the side edges of said front portion closing the sides, and a pair of rear portions in contacting relation, each extending from one of the side portions.

2. A one-piece metal fastener device for use in fastening the extremity of a looped end of a handle strap to the body of the strap comprising a tubular metal sleeve member having a body substantially square in cross section including a front portion to receive the overlapping extremity of the looped end and the adjacent portion of the body of the strap, means on the front portion for penetrating the said extremity of the looped end and the adjacent portion of the body of the strap, rearwardly extending side portions at the side edges of said front portion, and a pair of rear portions each extending from one of the side portions, the free end edges of said rear portions having means for interlocking with each other.

3. A one-piece metal fastener device for use in fastening the extremity of a looped end of a handle strap to the body of the strap comprising a tubular metal sleeve member having a body substantially square in cross section including a front portion to receive the overlapping extremity of the looped end and the adjacent portion of the body of the strap, means on the front portion for penetrating the said extremity of the looped end and the adjacent portion of the body of the strap, rearwardly extending side portions at the side edges of said front portion, and a pair of rear portions each extending from one of the side portions, the free end edges of said rear portions having teeth in meshing relation.

4. A one-piece metal fastener device for use in fastening the extremity of a looped end of a handle strap to the body of the strap comprising a tubular metal sleeve member having a body substantially square in cross section including a front portion to receive the overlapping extremity of the looped end and the adjacent portion of the body of the strap, a pair of prongs extending inwardly from the front portion of the body of the sleeve member, rearwardly extending side portions at the side edges of said front portion, and a pair of rear portions each extending from one of the side portions, the free end edges of said rear portions having means for interlocking with each other.

5. A one-piece metal fastener device for use in fastening the extremity of a looped end of a handle strap to the body of the strap comprising a tubular metal sleeve member having a body substantially square in cross section including a front portion to receive the overlapping extremity of the looped end and the adjacent portion of the body of the strap, a pair of prongs extending inwardly from the front portion of the body of the sleeve member, rearwardly extending side portions at the side edges of said front portion, and a pair of rear portions each extending from one of the side portions, the free end edges of said rear portions having teeth in meshing relation.

6. A one-piece metal fastener device for use in fastening the extremity of a looped end of a handle strap to the body of the strap comprising a tubular metal sleeve member having a body substantially square in cross section including a front portion to receive the overlapping extremity of the looped end and the adjacent portion of the body of the strap, a pair of prongs extending inwardly from the front portion of the body of the sleeve member, rearwardly extending side portions at the side edges of said front portion, and a pair of rear portions each extending from one of the side portions, the free end edges of said rear portions having teeth in meshing relation, and a strip of leather covering the outer surface of the body of the tubular sleeve member.

7. A flexible strap handle for use on a lady's handbag and the like comprising an elongated strap of leather looped on itself at each end and a split metal sleeve for anchoring the extreme end of each loop to the body of the strap and for covering the unfinished end of the loop, said sleeve having prongs extending inwardly penetrating the overlapping portions of the looped end and the body of the strap, with their extreme ends bent over the extreme end of the loop, the edges of the split in the sleeve being formed with intermeshing teeth, the upper end edge of each sleeve encircling the strap above the extreme end of the loop for concealing said end.

8. A one-piece metal fastener device for use in fastening the extremity of a looped end of a handle strap to the body of the strap comprising a tubular metal sleeve member having a body substantially square in cross section including a front portion to receive the overlapping extremity of the looped end and the adjacent portion of the body of the strap, a pair of prongs extending inwardly from the front portion of the body of the sleeve member, rearwardly extending side portions at the side edges of said front portion, and a pair of rear portions each extending from one of the side portions, the free end edges of said rear portions being squared off and in abutting relation.

References Cited in the file of this patent

UNITED STATES PATENTS

| | | |
|---|---|---|
| 742,993 | Izant | Nov. 3, 1903 |
| 1,030,069 | Flaxbaum | June 18, 1912 |
| 1,720,617 | Wolf | July 9, 1929 |
| 2,234,577 | Reiter | Mar. 11, 1941 |